United States Patent
Watabe et al.

(10) Patent No.: US 9,409,446 B2
(45) Date of Patent: Aug. 9, 2016

(54) PNEUMATIC RADIAL TIRE WITH TREAD HAVING BLOCKS HAVING WAVED SIPES

(75) Inventors: Ryoichi Watabe, Tokyo (JP); Koujiro Yamaguchi, Tachikawa (JP)

(73) Assignee: BRIDGESTONE CORPORATION, Tokyo (JP)

( * ) Notice: Subject to any disclaimer, the term of this patent is extended or adjusted under 35 U.S.C. 154(b) by 957 days.

(21) Appl. No.: 12/667,572

(22) PCT Filed: Jul. 1, 2008

(86) PCT No.: PCT/JP2008/061897
§ 371 (c)(1),
(2), (4) Date: Jan. 4, 2010

(87) PCT Pub. No.: WO2009/005056
PCT Pub. Date: Jan. 8, 2009

(65) Prior Publication Data
US 2010/0212794 A1   Aug. 26, 2010

(30) Foreign Application Priority Data
Jul. 5, 2007   (JP) .................................. 2007-177502

(51) Int. Cl.
*B60C 11/12*   (2006.01)
*B60C 11/11*   (2006.01)

(52) U.S. Cl.
CPC ................. *B60C 11/11* (2013.01); *B60C 11/12* (2013.01); *B60C 11/1218* (2013.04); *B60C 11/1263* (2013.04); *B60C 2011/1213* (2013.04); *B60C 2011/1227* (2013.04)

(58) Field of Classification Search
CPC ................... B60C 11/1263; B60C 2011/1213; B60C 11/1259
USPC ................................ 152/209.22, 902, DIG. 3
See application file for complete search history.

(56) References Cited

U.S. PATENT DOCUMENTS 5,301,727 A  *  4/1994  Inoue ........................ 152/DIG. 3
6,000,450 A  *  12/1999  Kishimoto et al. ........ 152/209.1
(Continued)

FOREIGN PATENT DOCUMENTS

EP   0 844 107 A2   5/1998
EP   1 090 781 A2   4/2001
(Continued)

OTHER PUBLICATIONS

Machine translation for Japan 2005-119415 (no date).*
(Continued)

*Primary Examiner* — Steven D Maki
(74) *Attorney, Agent, or Firm* — Sughrue Mion, PLLC

(57) ABSTRACT

The present invention provides a pneumatic radial tire which is, by effectively suppressing collapse-deformation of a relatively large magnitude in sectioned portions of each block, which sections are demarcated by sipes, and also effectively preventing the sipe from making narrowing-deformation, excellent in not only driving performance and braking performance on an icy or snowy road but also driving stability on a general road. The tire characteristically includes: a tread having a contact surface 1; plural circumferential grooves 2; plural lateral grooves 3; blocks 4 demarcated by the circumferential grooves and the lateral grooves in the contact surface of the tread; and plural sipes 5 provided in the blocks 4, wherein the bottom portion of each sipe 5 is provided with at least one upward-protruding projection 7 for integrally connecting respective facing groove walls of the sipe 5.

7 Claims, 7 Drawing Sheets

(56) References Cited

U.S. PATENT DOCUMENTS

| | | | |
|---|---|---|---|
| 6,050,313 A * | 4/2000 | Tsuda | B60C 11/12 |
| | | | 152/209.18 |
| 6,554,034 B1 | 4/2003 | Minami | |
| 2002/0170643 A1* | 11/2002 | Kuze | 152/209.18 |
| 2008/0135149 A1 | 6/2008 | Sakamaki | |

FOREIGN PATENT DOCUMENTS

| | | | | |
|---|---|---|---|---|
| JP | 63-137003 | A | | 6/1988 |
| JP | 63-129603 | U | | 8/1988 |
| JP | 3-92403 | A | | 4/1991 |
| JP | 03-169723 | A | * | 7/1991 |
| JP | 06-219108 | A | * | 8/1994 |
| JP | 09-142110 | A | * | 6/1997 |
| JP | 10-309910 | A | * | 11/1998 |
| JP | 10-309910 | A | | 11/1998 |
| JP | 2005-067274 | A | * | 3/2005 |
| JP | 2005-67274 | A | | 3/2005 |
| JP | 2005-119415 | A | * | 5/2005 |
| JP | 2005-132236 | A | | 5/2005 |
| JP | 2006-62468 | A | | 3/2006 |
| JP | 2006-193088 | A | | 7/2006 |
| JP | 2007-55285 | A | | 3/2007 |
| JP | 2007-069652 | A | * | 3/2007 |

OTHER PUBLICATIONS

Machine translation for Japan 2005-067274 (no date).*
Machine translation for Japan 06-219108 (no date).*
Translation for Japan 03-169723 (no date).*
Machine translation for Japan 10-309910 (no date).*
Machine translation for Japan 09-142110 (no date).*
Machine translation of Japan 2007-069652 (no date).*
Japanese Office Action issued in the corresponding Japanese Application No. 2007-177502 dated Apr. 17, 2012.
European Search Report issued in European Application No. 08777748.8, dated Aug. 5, 2011.
Chinese Office Action issued in the corresponding Chinese Application No. 200880104018.9 dated Feb. 2, 2012.
International Search Report dated Aug. 26, 2008, 6 pages.
Chinese Office Action issued in Application No. 200880104018.9 dated Jul. 30, 2012.
Decision of Refusal issued in Application No. 2007-177502 dated Jul. 3, 2012.

* cited by examiner

PNEUMATIC RADIAL TIRE WITH TREAD HAVING BLOCKS HAVING WAVED SIPES

TECHNICAL FIELD

The present invention relates to a pneumatic radial tire, in particular, a pneumatic tire which is excellent in driving stability on a general road, as well as driving performance and braking performance on an icy or snowy road.

PRIOR ART

There has been commonly used what is called a studless tire as a pneumatic radial tire for running on an icy or snowy road. A studless tire generally has a number of blocks formed by demarcating a tread surface, as well as plural sipes provided in the blocks to extend in the tire widthwise direction. General examples of sipes to be formed in the blocks include: what is called a two-dimensional sipe in which an opening of a sipe to a (ground) contact surface of a tread extends, for example, in a wavy, zigzag or linear shape and such an extending configuration of the sipe remains identical with that at the contact surface of the tread at any position in the depth direction of the sipe; and what is called a three-dimensional sipe which extends, for example, in a specific wavy, zigzag shape not only at the contact surface of the tread but also in the depth direction thereof.

These sipes can increase driving force, braking force and the like in the direction orthogonal to the extending direction of the sipe because each sipe is wedged into an icy or snowy road surface and causes an "edge effect" of enhancing friction force between a contact surface of the tread and the road surface.

Further, since each of these sipes sucks and thus removes a thin water film generated on an icy or snowy road surface due to ice melting as the tire is rotated under a load exerted thereon, into the inside of the sipe, and thus increases a contact are between a road surface and each block surface, i.e. a contact area between the road surface and a contact surface of the tread, the sipe can function to enhance driving performance, braking performance and driving stability, respectively.

Accordingly, a studless tire, which exhibits both an edge effect caused by a sipe opening edge thereof and a water-film removing effect caused by the sipe itself, can demonstrate excellent running performance on an icy or snowy road surface.

It is necessary to maintain a sufficiently large volume of a sipe groove even when a relatively large force is exerted on a contact surface of a tread, or more directly, on a block surface in order to effectively suck and remove a water film by a sipe. In view of this, sectioned portions of a block, which portions are sectioned by sipes, must be respectively provided with some degree of rigidity which should prevent the sipe from locally or entirely being narrowed or deformed even when the respective sectioned portions of a block are subjected to warping-deformation.

On the other hand, if the number of sipes formed at a block surface is increased to enhance an edge effect caused between a contact surface of a tread and an icy or snowy road surface, rigidity of the respective sectioned portions of the block demarcated by the sipes is lowered and a magnitude of collapse-deformation of each sectioned portion of the block increases, whereby a contact area between the block as a whole and a road surface is decreases and driving stability may deteriorate.

Regarding the configuration of sipe formation, in a case where a three-dimensional sipe is formed, protruded portions and recessed portions in a zigzag shape of the sipe sustain each other in the depth direction thereof when the respective sectioned portions of each block are subjected to warping-deformation due to an external force being exerted thereon, whereby decrease in the contact area between the block and the ground is suppressed because of increased rigidity of the block and deterioration of driving stability can be prevented to some extent from occurring because of significantly even contact of the block with the ground, as compared with a two-dimensional sipe. However, there still remains a concern of a relatively large magnitude of collapse-deformation of the sectioned portions of a block when a relatively large force is exerted on a contact surface of a tread, or more directly, on the block, which collapse-deformation may lead to narrowing deformation of the sipe.

Further, JP 2007-055285 discloses a technique in which columnar projections are provided at respective facing groove walls of a sipe to face each other, so that the facing projections of the respective groove walls are brought into contact with each other to sustain respective sectioned portions of blocks when the respective sectioned portions of the blocks are warping-deformed, enabling efficient reservoir and drainage of water by ensuring a sufficiently large volume of the sipe.

However, in a case of the tire disclosed in JP 2007-055285, when the respective sectioned portions of the blocks are significantly warping-deformed due to a relatively large force being exerted thereon, for example, misalignment in positions of the respective projections facing each other at the respective groove walls of the sipe may occur, marring an effect based on the projections sustaining each other.

Further, there may be a case where, although no misalignment in positions of the projections as described above occurs, a significantly large input to the block cannot be sustained only by the projections, whereby the sectioned portions of the block are significantly deformed, the sipe is prevented from demonstrating the expected functions and/or driving stability may deteriorate.

Yet further, studless tires are often used on a general road surface such as a dry road surface or a wet road surface, as well as on an icy or snowy road surface. Therefore, if the number of provided sipes is increased only in view of driving performance, braking performance and the like on an icy or snowy road surface, rigidity of the entire block may not be sufficient and respective sectioned portions of the block may exhibit excessive collapse-deformation on a dry or wet road surface, whereby a contact area between the block and the ground decreases and driving stability may deteriorate.

DISCLOSURE OF THE INVENTION

Problems to be Solved by the Invention

An object of the present invention is therefore to provide a pneumatic radial tire which is excellent in driving stability on a general road, as well as driving performance and braking performance on an icy or snowy road, by effectively suppressing a relatively large magnitude of collapse-deformation of sectioned portions of blocks, which portions are demarcated by sipes provided in the blocks, and also effectively preventing the sipe from making narrowing-deformation.

Means for Solving the Problems

A pneumatic radial tire according to the present invention including:

a tread having a contact surface; plural circumferential grooves provided in the contact surface of the tread to each extend in the tread circumferential direction; plural lateral grooves provided in the contact surface of the tread to each extend in the tread widthwise direction so as to intersect the circumferential groove; blocks demarcated by the circumferential grooves and the lateral grooves in the contact surface of the tread; and plural sipes provided in at least one block, preferably in each of the blocks, to extend so as to be more inclined toward the tread widthwise direction than the tread circumferential direction, characterized in that the bottom portion of each sipe is provided with at least one upward-protruding projection for integrally connecting respective facing groove walls of the sipe.

In the present invention, the circumferential grooves and the lateral grooves may extend not only in the linear extending configuration but also, for example, in a zigzag, wavy or crank-like configuration. The shape, in a developed plan view, of the block defined by a plurality of the circumferential grooves and the lateral grooves may be a square, a parallelogram, a polygon or an irregular shape. The dimension, the number to be provided and the like, of each block, may be appropriately selected according to necessity. The upward-protruding projection is not limited to a projection linearly protruding upward and may be a projection curvedly protruding upward. The rear end of the projection may be either linear or curved.

The sipe may of course have a linear extending configuration or have, for example, a zigzag, wavy or crank-like extending configuration. The sipe may be structured as either a two-dimensional sipe or a three-dimensional sipe.

The sipe is not limited to that of which both ends open to the circumferential groove and/or the lateral groove and may be that of which both ends do not open to the circumferential groove and/or the lateral groove or that of which only one end opens to the circumferential groove or the lateral groove.

In the present invention, the expression that "the sipe extends so as to be more inclined toward the tread widthwise direction than the tread circumferential direction" means that the sipe edge component extending in the tread widthwise direction is larger than the sipe edge component extending the tread circumferential direction.

Further, a "length along a sipe bottom" means a length along the widthwise center line of the sipe bottom.

Yet further, "the upper end of the projection" represents, regardless of the configuration of the top surface or the like of the projection, the upper end structure of a portion of the projection contributing to integral connection of sipe groove walls.

In such a tire as described above, the length along the sipe bottom of each projection is preferably in the range of 0.2 to 2.0 mm and the depth of the upper end of the projection, measured from the block surface, is preferably in the range of 20 to 80% of the sipe depth.

The number(s) of the projections in a sipe/sipes located on the most-leading side or/and the most-trailing side of one block, e.g. the numbers of the projections in respective sipes located on the most-leading side and the most-trailing side of one block, is preferably larger than the number of the projections in a sipe located in the middle portion of the block.

In the present invention, a "sipe located in the middle portion of a block" represents a sipe present closest to the middle point between the sipe located on the most-leading side and the sipe located on the most-trailing side of the block.

The ratio of the number of the projections in a sipe located in the middle portion of a block, with respect to the number(s) of the projections in a sipe/sipes located on the most-leading side or/and the most-trailing side of one block, is preferably is in the range of 0.2:1 to 1:1.

Further, the total sectional area(s) of the projections in a sipe/sipes located on the most-leading side or/and the most-trailing side of one block is preferably larger than the total sectional area of the projections in a sipe located in the middle portion of the block.

In the present invention, a "sectional area" of a projection can be obtained from the average height of the projection measured from the sipe bottom and the average width thereof extending along the sipe. The total sum of the sectional areas of the projections in a sipe is "the total sectional area" of the projections.

The ratio of the total sectional area of the projections in a sipe located in the middle portion of a block, with respect to the total sectional area(s) of the projections in a sipe/sipes located on the most-leading side or/and the most-trailing side of one block, is preferably is in the range of 0.1:1 to 1:1.

In any of the radial tires described above, regarding respective blocks in plural block rows demarcated by a plurality of the circumferential grooves and the lateral grooves, the total number(s) of the projections in sipes of the block/blocks located on one outermost side/on respective outermost sides in the widthwise direction of a tread is preferably larger than the total number of the projections in sipes of a block located in the center region of the tread, and more preferably larger than the total number of the projections in sipes of blocks located adjacent on respective sides of the center region of the tread.

In the present invention, "a block located in the center region of the tread" represents a block located closest to the pattern center of the tread.

The ratio of the total number of the projections in sipes of a block located in the center region of the tread, with respect to the total number(s) of the projections in sipes of a block/blocks located on one outermost side/on respective outermost sides in the widthwise direction of a tread, is preferably in the range of 0.2:1 to 1:1.

Regarding respective blocks in plural block rows demarcated by a plurality of the circumferential grooves and the lateral grooves, the total sectional area(s) of the projections in sipes of the block/blocks located on one outermost side/on respective outermost sides in the widthwise direction of a tread is preferably larger than the total sectional area of the projections in sipes of a block located in the center region of the tread.

Further, the ratio of the total sectional area of the projections in sipes of a block located in the center region of the tread, with respect to the total sectional area(s) of the projections in sipes of a block/blocks located on one outermost side/on respective outermost sides in the widthwise direction of a tread, is preferably in the range of 0.1:1 to 1:1.

Effect of the Invention

According to the pneumatic radial tire of the present invention, when the tire is rotated with a load exerted thereon on an icy or snowy road surface, the plural circumferential grooves formed in the contact surface of the tread to extend in the tread circumferential direction and the plural lateral grooves formed in the contact surface of the tread to extend in the tread widthwise direction to intersect these circumferential grooves each contribute, under the actions of the groove edges thereof, to improving anti-skid performance, driving performance and braking performance, respectively.

Further, according to the pneumatic radial tire of the present invention, since sipes are formed in the blocks demarcated by the circumferential grooves and the lateral grooves such that these sipes extend to be more inclined toward the tread widthwise direction than the tread circumferential direction, driving force and braking force can be reliably increased by an edge effect as an action of the sipes in the blocks with respect to a road surface when a vehicle is driven or subjected to braking on an icy or snowy road surface.

Yet further, according to the tire of the present invention, the bottoms of the plural sipes formed in a block as described are each provided with at least one and preferably more than one upward-protruding projections for integrally connecting respective facing groove walls of the sipe with each other, such that the respective sectioned portions of each block, sectioned by the respective sipes, are connected with each other by way of the projections and the respective portions of each block can reliably support each other all the time. As a result, warping-deformation of the sectioned portions of each block can be suppressed by collaboration of the sectioned portions themselves.

Accordingly, not only driving force, braking force and the like can be increased by an edge effect caused by the opening edges of the sipes but also rigidity of the sectioned portions of a block, which block is sectioned by the sipes, can be ensured under reliable and constant support between the sectioned portions by way of the projections, whereby a contact area is prevented from decreasing and driving stability, for example, can be increased.

Further, when the sectioned portions of the block is subjected to warping-deformation, a sufficient clearance between the facing groove walls and thus the required sipe volume can be reliably obtained under the constrain of the sectioned portions effected by themselves therebetween, whereby an efficient water removing effect can be obtained.

Yet further, when the tire is run with a load exerted thereon on a general road surface such as a dry or wet road surface, collapse-deformation of the respective sectioned portions of each block can be advantageously suppressed by the projections in the sipes and thus relatively high rigidity and a sufficiently large ground contact area of the block as a whole can be ensured, whereby driving stability can be improved, as compared with the conventional tires.

EXPLANATION OF REFERENCE NUMERALS

Figure 1:
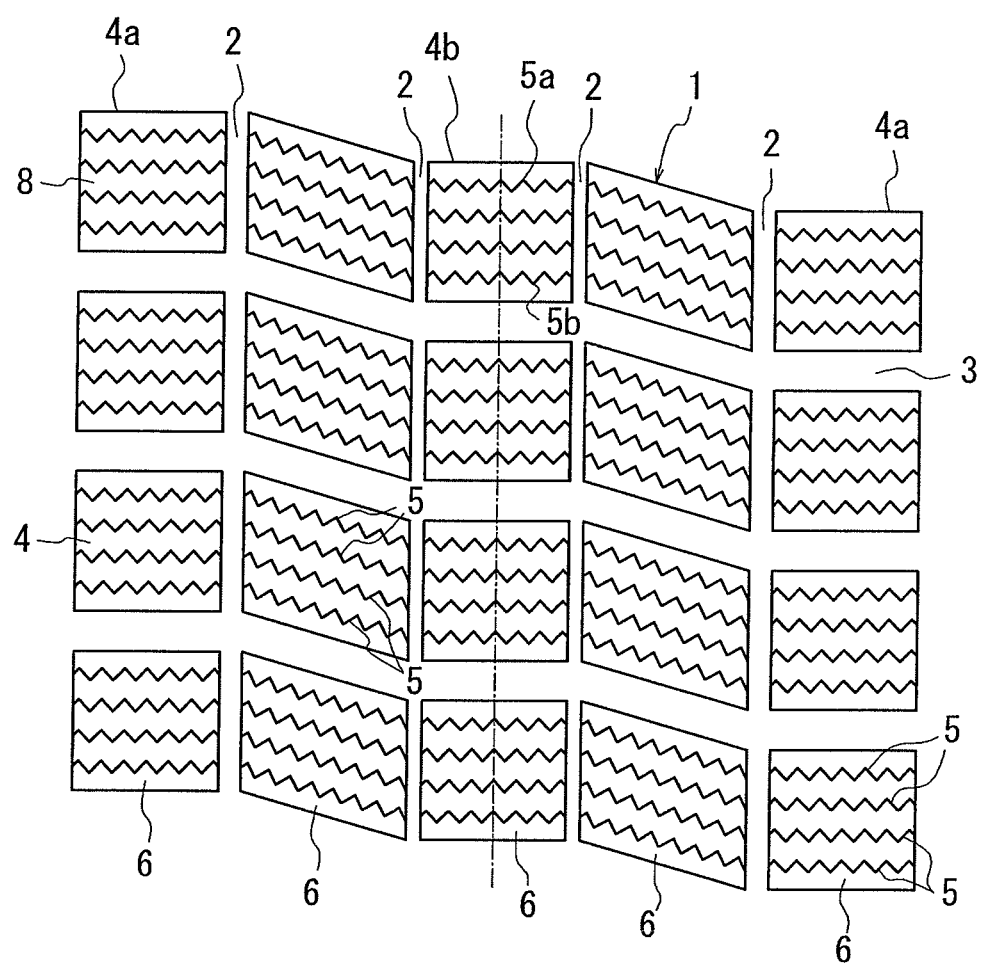
FIG. 1 is a partial developed view of a tread pattern showing an embodiment of a pneumatic radial tire of the present invention.

1 Contact surface of tread
2 Circumference groove
3 Lateral groove
4 Block
4a Side region block
4b Center region block
5 Sipe
5a Leading side sipe
5b Trailing side sipe
6 Block row
7 Projection
8 Sectioned portions of block
11 Blade
12 Slit

BEST MODE FOR IMPLEMENTING THE INVENTION

A pneumatic radial tire of the present invention will be described in detail with reference to drawings hereinafter.

Figure 2:
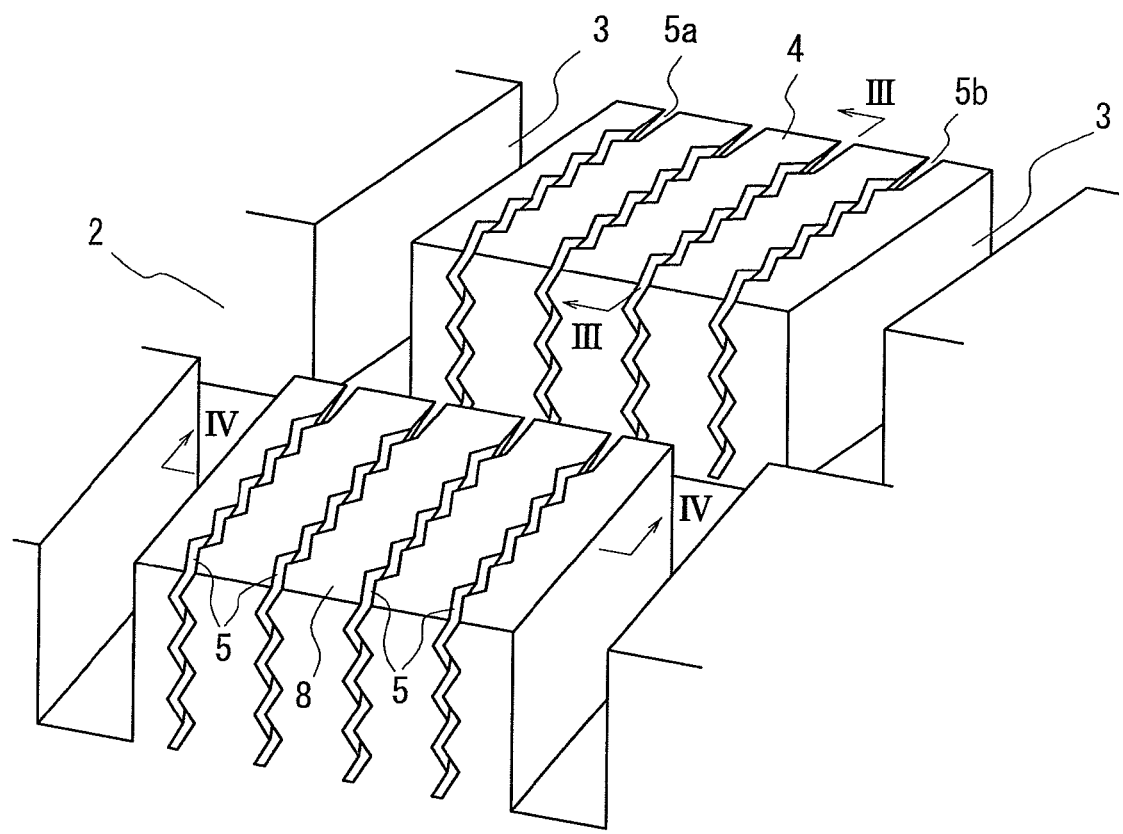
FIG. 2 is a partially enlarged perspective view showing a block in the tread pattern shown in FIG. 1.

FIG. 1 is a partial developed view of a tread pattern showing an embodiment of a pneumatic radial tire of the present invention. FIG. 2 is a partially enlarged perspective view showing blocks in the tread pattern shown in FIG. 1.

Figure 3:
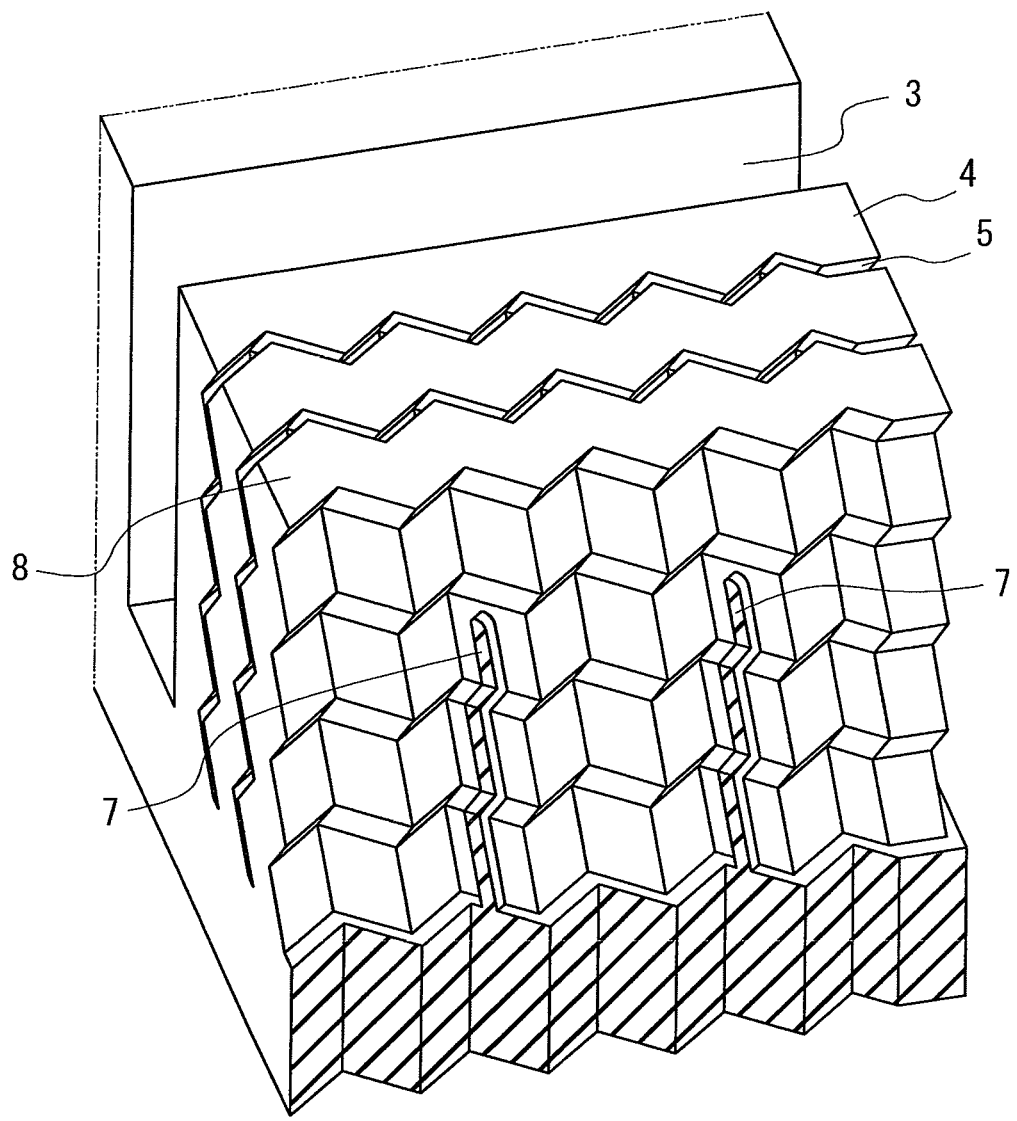
FIG. 3 is a sectional perspective view cut along the line in FIG. 2.

FIG. 3 is a sectional perspective view cut along the line of FIG. 2.

In FIG. 1, the reference number 1 represents a contact surface of a tread, 2 represents plural annular circumferential grooves provided in the contact surface 1 of the tread to extend in the circumferential direction, 3 represents plural lateral grooves extending in the tread widthwise direction to intersect the respective circumferential grooves 2, 4 represents a block defined by the plural circumferential grooves 2 and the plural lateral grooves 3, and 5 represents plural sipes provided in each block 4 to extend so as to be more inclined toward the tread widthwise direction than the tread circumferential direction.

In the structure as shown in FIG. 1, in the contact surface 1 of the tread, four circumferential grooves 2 extending linearly in the tread circumferential direction are provided such that the width and the depth of each of the circumferential grooves are 5.0 to 8.0 mm and 8 to 9 mm, respectively and plural lateral grooves 3 extending in the tread widthwise direction to intersect these circumferential grooves 2 are provided such that the width and the depth of each of the lateral grooves are 3.0 to 7.0 mm and 7 to 9 mm, respectively, such that five rows of block rows 6 are defined between the grooves 2, 3 and the tread side ends.

In the present embodiment, four sipes 5 each having, for example, what is called a three-dimensional configuration including the width in the range of 5 to 40 mm and the depth in the range of 6.0 to 10.0 mm are formed in each block 4 of respective block rows 6 such that each sipe extends to be more inclined toward the tread widthwise direction than the tread circumferential direction. The sipe 5 shown in the drawings is a three-dimensional sipe extending in a zigzag form in both tread widthwise and depth directions.

Figure 4:
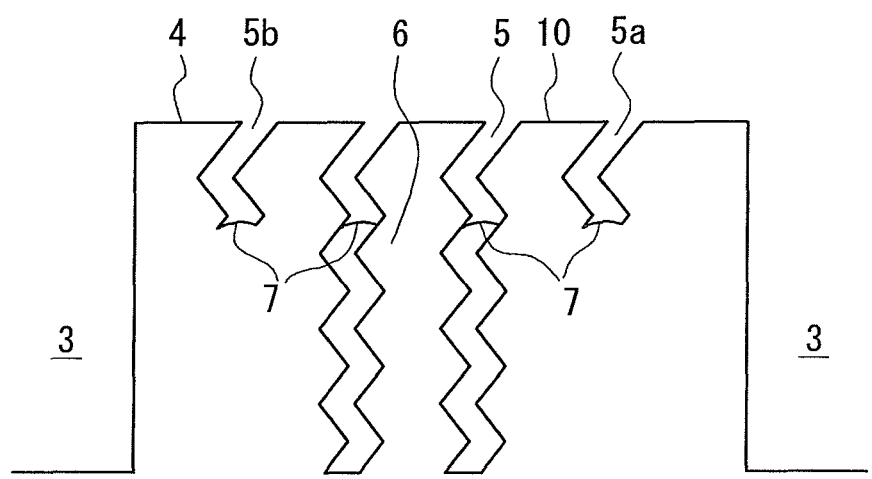
FIG. 4 is a sectional view cut along the IV-IV line in FIG. 2.

Further, in the tire of the present embodiment, as shown in FIGS. 3 and 4, the bottom portion of each sipe 5 is provided with at least one upward-protruding projection 7 for integrally connecting the facing groove walls of the sipe 5. In the present embodiment, each projection 7 has the length along the sipe bottom, which length is in the range of 0.2 to 2.0 mm, and the depth of the upper end of the projection measured from a block surface, which is in the range of 20 to 80% of the sipe depth.

By setting the length along the sipe bottom of each projection 7 in the range of 0.2 to 2.0 mm, collapse-deformation of sectioned portions 8 of each block can be suppressed to ensure a sufficiently large ground contact area on a general road surface such as a dry or wet road surface, as well as on an icy or snowy road surface, and water can be reliably drained into the sipes. That is, driving stability can be improved accordingly.

In a case where the length along the sipe bottom is shorter than 0.2 mm, collapse-deformation of sectioned portions 8 of each block cannot be suppressed and a ground contact area may be reduced, which tends to deteriorate driving stability on an icy road surface. In a case where the length along the sipe bottom exceeds 2.0 mm, a volume of water which can be sucked into the sipe 5 decreases and the water-removing function is lowered, which tends to deteriorate driving stability.

Further, by setting the depth of the upper end of the projection measured from the block surface in the range of 20 to 80% of the sipe depth, the sectioned portions 8 of each block collapse-deform in an adequate manner when the tire is used as a brand-new tire on an icy road surface and therefore an edge effect and an effect of removing a water film can be both obtained.

In a case where the depth of the upper end of the projection measured from the block surface exceeds 80% of the sipe depth, collapse-deformation of the sectioned portions 8 of each block cannot be suppressed, whereby a ground contact area decreases and driving stability on an icy road surface tends to deteriorate. In a case where the depth of the upper end of the projection measured from the block surface is less than 20% of the sipe depth, the volume of water which can be accommodated in the sipe 5 decreases and the water-removing function is lowered, whereby braking performance and driving performance on an icy or snowy road surface tend to deteriorate.

Figure 5:
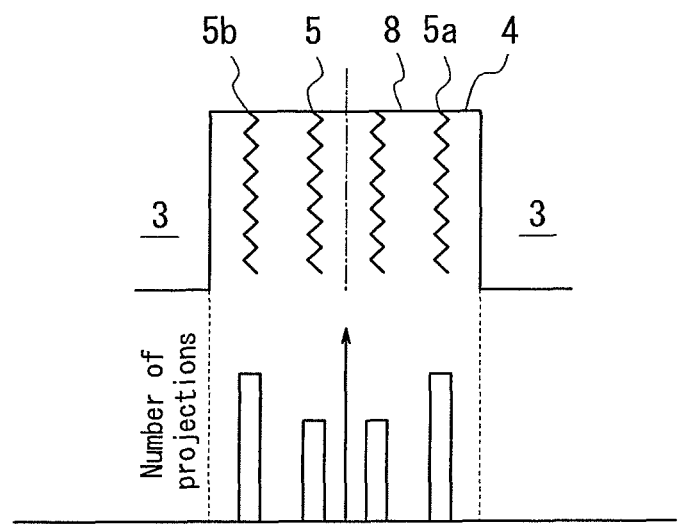
FIG. 5 is a view showing a sectional view in the tread circumferential direction of a block formed at a contact surface of a tread and a graph showing the number of projections provided in respective sipes of the block.

FIG. 4 is a sectional view cut along the IV-IV line of FIG. 2. FIG. 5 is a sectional view in the tread circumferential direction of a block formed at the contact surface of the tread of FIG. 1 and a graph showing the number of projections provided in respective sipes of the block.

In a preferable example where a single block is analyzed, the number of the projections 7 provided in the leading-side sipe 5a located on the most-leading side of the block 4 and the number of the projections 7 provided in the trailing-side sipe 5b located on the most-trailing side of the block 4 are larger than the number of the projections 7 provided in a sipe located in the middle portion of the block 4, respectively.

The sectioned portions 8 of each block 4 in the vicinity of the middle portion thereof naturally experience a relatively small degree of collapse-deformation due to support provided by the other sectioned portions 8 adjacent thereto when an external force is exerted thereon. In contrast, the sectioned portions 8 of each block 4 located on the most-leading side and the most-trailing side may experience a relatively large degree of collapse-deformation thereof when a relatively large force is exerted on the block 4 because these outermost sectioned portions 8 have no or hardly any other sectioned portions 8 adjacent thereto that would support them, which relatively large degree of collapse-deformation may deteriorate a ground contact area.

In view of the aforementioned facts, in the present embodiment, the number(s) of the projections 7 in a sipe/sipes located on the most-leading side 5a or/and the most-trailing side 5b of the block 4 (the numbers of the projections 7 in the respective sipes 5a, 5b in FIG. 5) is made larger than the number of the projections 7 in a sipe located in the middle portion of the block 4, so that the force by which the sectioned portions 8 located on the most-leading side and the most-trailing side of the block 4 support each other, i.e. collapse-constraining force against warping-deformation, can be strengthened. As a result, a ground contact area is effectively prevented from decreasing, whereby driving performance and braking performance on an icy or snowy road surface improve and driving stability on a general road surface also improves.

In this case, an effect of ensuring the water-removing function at the block center, with preventing the block edges from collapse-deforming, can be obtained by gradually increasing the number of the projections 7 provided in the sipes of the block 4 from the middle portion toward the leading and the trailing sides of the block. As a result, a ground contact area increases, whereby driving performance and braking performance on an icy or snowy road surface improve and driving stability on a general road surface also improves.

In the design as shown in FIG. 5, the number of the projections 7 provided in the leading-side sipe 5a of each block 4 and the number of the projections 7 provided in the trailing-side sipe 5b of the block are the same. However, the numbers of the projections 7 of the respective sipes 5a, 5b may differ from each other.

The ratio of the number of the projections 7 in a sipe located in the middle portion of a block 4, with respect to the number/numbers of the projections 7 in the most-leading side sipe 5a or/and the most-trailing side sipe 5b of the block 4, is set in the range of 0.2:1 to 1:1 and specifically at 0.5:1. As a result, collapse-deformation of the sectioned portions 8 adjacent to the most-leading side sipe 5a and the most-trailing side sipe 5b of the block 4 can be suppressed and the water-removing function is likely to be ensured.

Further, the total sectional area/areas of the projections 7 in the most-leading side sipe 5a or/and the most-trailing side sipe 5b of the block 4 is made larger than the total sectional area of the projections 7 in a sipe located in the middle portion of the block 4. As a result, collapse-deformation of the sectioned portions 8 adjacent to the most-leading side sipe 5a and the most-trailing side sipe 5b of the block 4 can be suppressed and the water-removing function is likely to be ensured.

The total sectional area of the projections 7 in each sipe of the block 4 is gradually increased from the middle portion toward the most-leading side sipe 5a and the most-trailing side sipe 5b of the block 4, whereby there can be obtained an effect of ensuring the water-removing function at the center of the block, while preventing the block ends from collapse-deforming. As a result, a ground contact area increases and thus driving performance and braking performance on an icy or snowy road surface improve and driving stability on a general road surface also improves.

The total sectional area of the projections 7 provided in the most-leading side sipe 5a and the total sectional area of the projections 7 provided in the most-trailing side sipe 5b, of the block 4, may be either identical or different from each other.

The ratio of the total sectional area of the projections 7 in a sipe 5 located in the middle portion of the block 4, with respect to the total sectional area/areas of the projections 7 in the most-leading side sipe 5a or/and the most-trailing side sipe 5b of the block 4, is set in the range of 0.1:1 to 1:1 and particularly at 0.5:1 As a result, collapse-deformation of the sectioned portions 8 adjacent to the most-leading side sipe 5a and the most-trailing side sipe 5b of the block 4 can be suppressed and the water-removing function is likely to be ensured.

In the structure shown in FIG. 4, each of the four sipes 5 formed in the block 4 is provided with the projection 7. However, the projection 7 may be provided to only some of the sipes 5 formed in the block 4.

Figure 6:
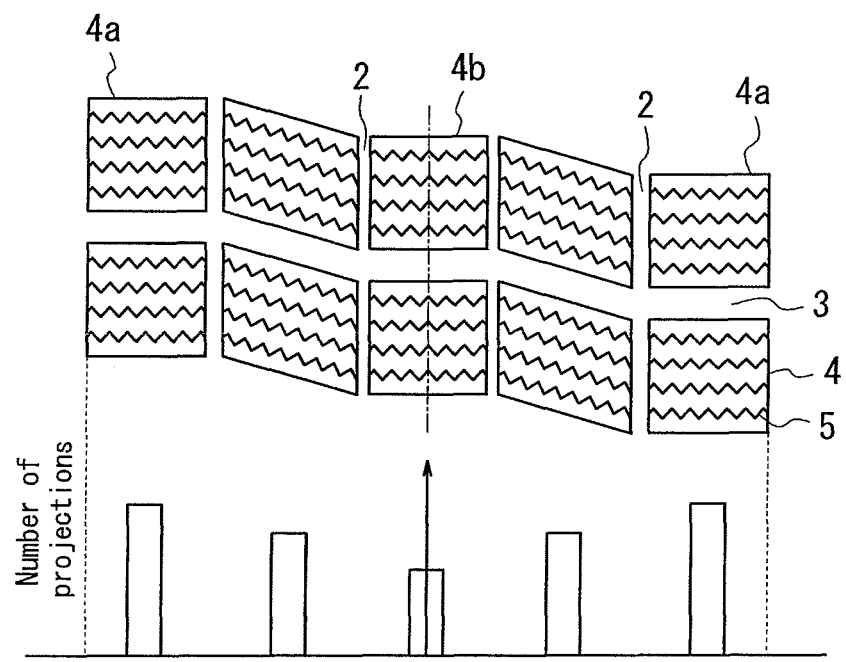
FIG. 6 is a developed plan view showing respective five block rows of the tread pattern shown in FIG. 1 and a graph showing the respective total numbers of projections in sipes provided in the blocks of the respective block rows.

FIG. 6 is a developed plan view showing respective five block rows of the tread pattern shown in FIG. 1 and a graph showing the respective total numbers of projections in sipes provided in the blocks of the respective block rows.

In a preferable example where the entire tread pattern is analyzed, the total number/numbers of the projections 7 in the sipes 5 of the block/blocks located on one outermost side/on respective outermost sides in the widthwise direction of the tread (the numbers of the projections 7 in the sipes of the respective side-region blocks 4a, 4a in FIG. 6) are preferably set larger than the total number of the projections 7 in the respective sipes 5 of the center-region block 4b as a block in the center region of the tread.

In the tread pattern, the side-region block 4a primarily affects braking performance and/or cornering performance and the center-region block 4b primarily affects braking performance and driving performance.

In view of this, regarding respective blocks 4 in plural block rows demarcated by a plurality of the circumferential grooves 2 and the lateral grooves 3, the total number of the projections 7 in the sipes 5 of a side-region block 4a located on one outermost side in the widthwise direction of a tread or the total numbers of the projections 7 in the sipes 5 of side-region blocks 4a, 4a located on respective outermost sides in the widthwise direction of a tread (the total members of the respective side-region blocks 4a, 4a in FIG. 6) are preferably larger than the total number of the projections 7 in the sipes 5 of the center-region block 4b, whereby collapse-deformation of the sectioned portions 8 of the blocks, especially in warping-deformation, is suppressed and a ground contact area can be prevented from decreasing. As a result, the sectioned portions 8 of the side-region block 4a can ensure sufficient rigidity due to mutual support therebetween by way of the projections 7 and braking performance on an icy or snowy road and driving stability on a general road can be improved.

The sipes 5 in the center-region block 4b are provided with a relatively small total number of the projections 7, whereby mutual support between the sectioned portions 8 by way of the projections 7 is decreased and the sectioned portions 8 of the block 4b are subjected to an adequate degree of warping-deformation. As a result, the edge effect by the sipe edges is further enhanced and braking performance and acceleration performance on an icy or snowy road can be improved.

Accordingly, braking performance, acceleration performance and driving stability can be simultaneously improved by effecting an optimal change in distribution of the total number of the projections 7 in the pattern.

It is preferable that the total number of the projections 7 in the sipes 5 provided in the block 4 is gradually increased from the center-region block 4b toward the side-region blocks 4a so that the number of the projections 7 decreases and the edge effect enhances toward the center-region 4b. As a result of this, driving performance and braking performance on an icy or snowy road improve. Further, since the number of the projections 7 increases toward the side-region blocks 4a and rigidity is ensured, driving stability on a general road also improves.

In the design as shown in FIG. 6, the total number of the projections 7 provided in one side-region block 4a and the total number of the projections 7 provided in the other side-region block 4a are the same. However, the aforementioned total numbers of the projections 7 may be different from each other.

The ratio of the total number of the projections 7 in the sipes 5 of the center-region block 4b with respect to the total number(s) of the projections 7 in the sipes 5 of at least one of the side-region blocks 4a, 4a is set in the range of 0.2:1 to 1:1 and particularly set at 0.25:1. As a result, rigidity of a shoulder portion of the tread in a cornering situation, as well as the edge effect at the center portion of the tread, which center portion is mainly for use in acceleration, is likely to be obtained.

Further, the total sectional area(s) of the projections 7 in the sipes 5 of at least one of the side-region blocks 4a, 4a is set larger than the total sectional area of the projections 7 in the sipes 5 of the center-region block 4b. As a result, rigidity of a shoulder portion of the tread in a cornering situation, as well as the edge effect at the center portion of the tread, which center portion is mainly for use in acceleration, is likely to be obtained.

It is preferable that a sectional area of the projections 7 in the sipes 5 provided in each block 4 is gradually increased from the center-region block 4b toward the side-region blocks 4a so that the sectional area of the projections 7 decreases and the edge effect enhances toward the center-region 4b. As a result of this, driving performance and braking performance on an icy or snowy road improve. Further, since the sectional area of the projections 7 increases toward the side-region blocks 4a and rigidity is ensured, driving stability on a general road also improves.

The sectional area of the projections 7 provided in one side-region block 4a and the sectional area of the projections 7 provided in the other side-region block 4a, of the block 4, may be either the same or different from each other.

Further, the ratio of the total sectional area of the projections 7 in the sipes 5 of the center-region block 4b with respect to the total sectional area(s) of the projections 7 in the sipes 5 of at least one of the side-region blocks 4a, 4a is set in the range of 0.1:1 to 1:1 and particularly set at 0.25:1. As a result, rigidity of a shoulder portion of the tread in a cornering situation, as well as the edge effect at the center portion of the tread, which center portion is mainly for use in acceleration, is likely to be obtained.

In the pneumatic radial tire of the present invention, the extending configuration of the sipe 5 opening to a surface of the block 4 is not limited to a zigzag shape and may have a linear, crank-like or other required shape. Either one end or both ends of the sipe 5 may terminate within the block 4. The sipe 5 may be formed to have either a two-dimensional configuration or a three-dimensional configuration. Accordingly, although the sipe 5 is a three-dimensional sipe in the drawings, the sipe 5 may be structured as a two-dimensional sipe.

Figure 7:
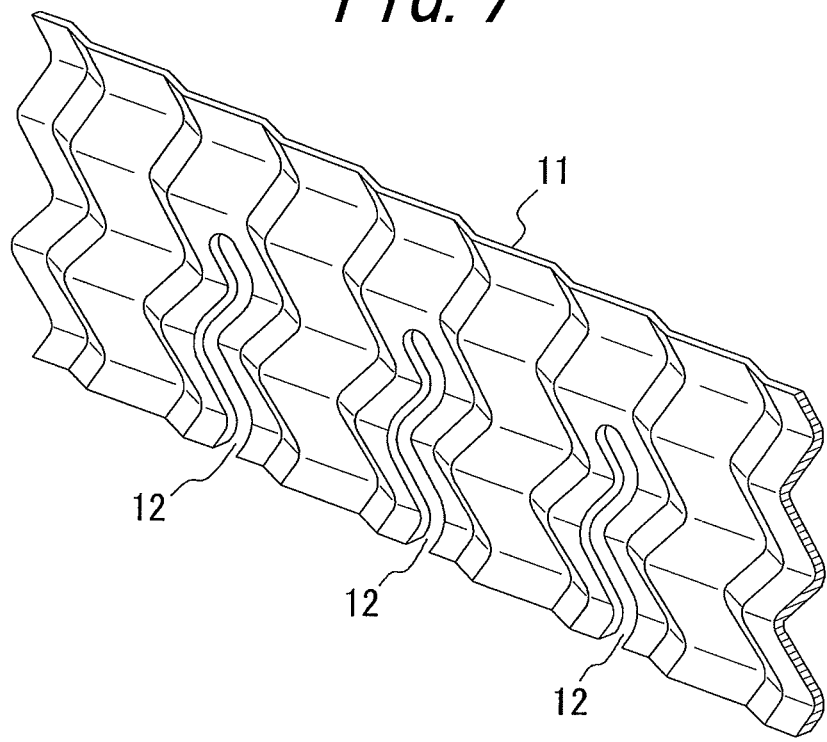
FIG. 7 is a sectional perspective view of a blade for forming the sipe of the present invention.
Figure 8:
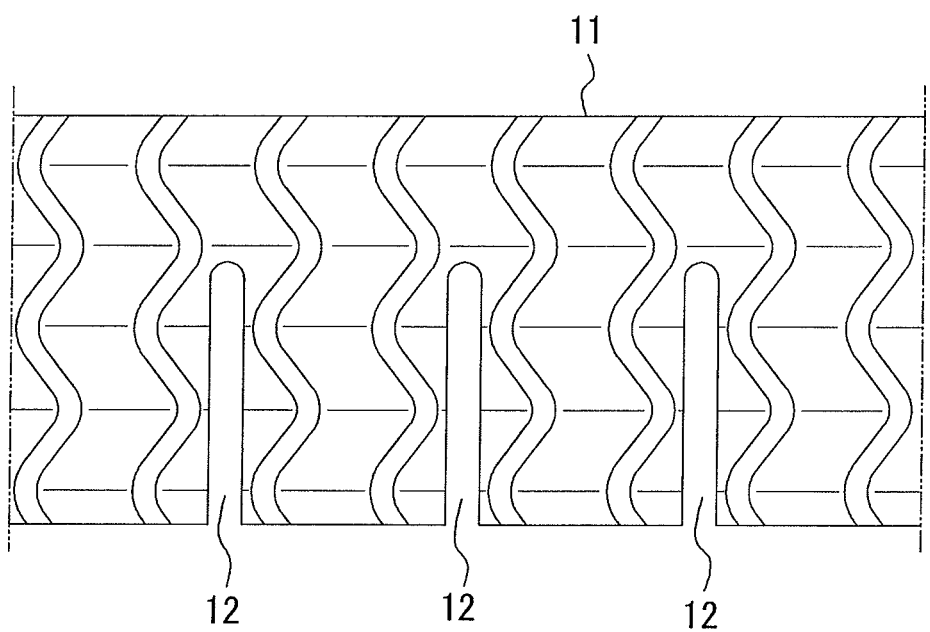
FIG. 8 is a front view of the blade of FIG. 7.

FIG. 7 is a sectional perspective view exemplarily showing a blade which is mounted to a vulcanization mold and can be used for forming the sipe 5 and the projection 7 in the sipe 5. FIG. 8 is a front view of the blade shown in FIG. 7.

Regarding formation of the sipe 5 provided with the projection 7 in the present invention, when a green tire is vulcanization-molded by the vulcanization mold, a slit in the blade 11 allows rubber to intrude therein and this rubber portion forms a projection 7, while the blade 11 itself expels rubber and thus forms a sipe 5.

PERFORMANCE TEST EXAMPLE 1

Figure 9:
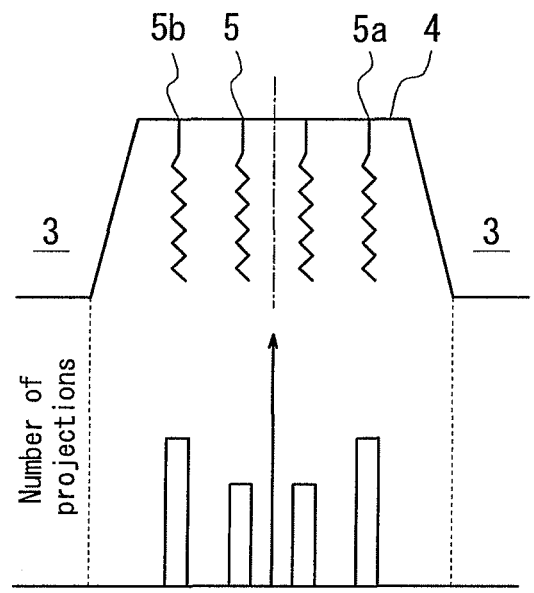
FIG. 9 is a sectional view cut along the IV-IV line of FIG. 2, of a tire used in Examples.
Figure 10:
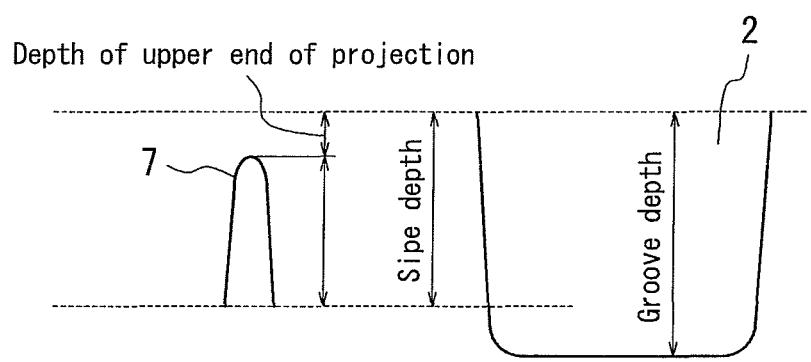
FIG. 10 is a sectional view of the projections used in Examples.

Next, test radial tires each having size of 195/65R15, pitch of 56 and a structure as show in FIGS. 1, 9 and 10 were produced. The characteristics of the test tires were varied, respectively, to be Example 1 tire, Example 2 tire, Example 3 tire and Comparative Example 1 tire. The acceleration performance on an icy or snowy road was analyzed for the respective test tires.

In these test tires, each of the four circumferential grooves has a dimension of width: 5 mm and depth: 9 mm and each of the lateral grooves has a dimension of width: 5 mm and depth: 9 mm. Four three-dimensional sipes each having width: 30 mm and depth: 7 mm are formed in each block of the respective five block rows defined in the tread circumferential direction. Each sipe is provided with a projection having width: 0.5 mm and depth which is 56% of the sipe depth.

The number of the projections provided in the pattern as a whole are set to be the same among the respective test tires. The tire structures other than a contact surface of a tread, of the test tires, are substantially the same as those of the conventional radial tire because these structures need no modification in the present invention.

In Example 1 tire, projections are provided to be evenly distributed throughout all sipes and three projections are provided with 7 mm interval therebetween in each sipe. In Example 2 tire, the respective sipes located on the leading side and the trailing side of each block are provided with four projections with 5 mm intervals therebetween and the respective sipes located in the middle portion of the block are provided with two projections with a 10 mm interval therebetween. In Example 3 tire, the blocks included in the tread center region in the tread pattern are each provided with a projection, the blocks adjacent to the center-region blocks are each provided with three projections with 7 mm intervals therebetween, and the blocks on the respective tread side regions are each provided with four projections with 5 mm intervals therebetween. In Comparative Example 1 tire, no projections are provided in sipes thereof.

(Acceleration Performance)

For each of the tires of Examples 1 to 3 and Comparative Example 1, acceleration time required for accelerating speed from 5 to 150 km/h was measured in a condition where the tire was assembled with a rim of 6JJ, inflated at an inner pressure of 200 kPa and mounted to a FR vehicle with a load of a driver's weight and 60 kg, with maintaining an acceleration limit state in which the tire was narrowly prevented from slipping on an icy road.

The results are shown by indices in Table 1. Indices are expressed as relative values with respect to 100 as the result of Comparative Example 1. The larger index value represents a better result.

TABLE 1

| | Example 1 tire | Example 2 tire | Example 3 tire | Comparative Example 1 tire |
|---|---|---|---|---|
| Acceleration performance on icy road | 102 | 104 | 105 | 100 |

From the results shown in Table 1, it is understood that the tires of Examples 1 to 3, having projections provided in sipes thereof, exhibit better acceleration performance on ice than the tire of Comparative Example 1. Further, it is understood that an edge effect is further improved by decreasing the number projections in sipes in the block in the tread center region, as compared with the number of projections in sipes in the blocks on the respective tread side regions.

Performance Test Example 2

(Braking Performance)

For each of the tires of Examples 1 to 3 and Comparative Example 1, a braking distance required for decreasing speed from 20 to 0 km/h on an icy road was measured at the full-braking state where the tires were completely locked.

The results are shown by indices in Table 2. Indices are expressed as relative values with respect to 100 as the result of Comparative Example 1. The larger index value represents a better result.

TABLE 2

| | Example 1 tire | Example 2 tire | Example 3 tire | Comparative Example 1 tire |
|---|---|---|---|---|
| Braking performance on icy road | 105 | 108 | 107 | 100 |

From the results shown in Table 2, it is understood that the tires of Examples 1 to 3, having projections provided in sipes thereof, exhibit better braking performance on ice than the tire of Comparative Example 1. Further, it is understood that Example 2 tire, where the numbers of projections in sipes located on the most-leading side and the most-trailing side of each block are set larger than the number of projections in sipes located at the middle portion of the block, exhibits relatively small decrease in a ground contact area of the tread portion and good braking performance.

Performance test example 3

(Cornering Performance)

Reaction speed and accuracy of movement of the vehicle in a cornering situation on a general road were evaluated, with 10 points as the full score, for each of the tires of Examples 1 to 3 and Comparative Example 1.

The results are shown in Table 3. The larger represents the better performance.

TABLE 3

| | Example 1 tire | Example 2 tire | Example 3 tire | Comparative Example 1 tire |
|---|---|---|---|---|
| Cornering performance on general road | 5.0 | 5.3 | 5.5 | 4.0 |

From the results shown in Table 3, it is understood that the tires of Examples 1 to 3, where the projections inside the sipes reinforce each block, exhibit better cornering performance on a general road than the tire of Comparative Example 1. Further, it is understood that Example 3 tire exhibits the highest rigidity of the blocks on the respective tread side regions and is satisfactory.

From the results of Tables 1 to 3, it is understood that the tires of Examples 1 to 3, having projections provided in sipes thereof, exhibit better acceleration and braking performances on ice and better cornering performance on a general road than the tire of Comparative Example 1.

Further, it is possible to adapt to either a tire putting emphasis on cornering performance or a tire putting emphasis on braking performance on an icy road by changing positions of the projections inside the sipes.

The invention claimed is:

1. A pneumatic radial tire comprising: a tread having a contact surface; plural circumferential grooves provided in the contact surface of the tread to each extend in the tread circumferential direction; plural lateral grooves provided in the contact surface of the tread to each extend in the tread widthwise direction so as to intersect the circumferential grooves; blocks demarcated by the circumferential grooves and the lateral grooves in the contact surface of the tread; and plural waved sipes provided in the blocks to extend so as to be more inclined toward the tread widthwise direction than the treed circumferential direction, characterized in that a bottom portion of each waved sipe is provided with at least one upward-protruding projection for integrally connecting respective facing groove walls of the waved sipe, wherein a number/numbers of the projections in a waved sipe/sipes located on a most-leading side or/and a most-trailing side of one block is larger than the number of the projections in a waved sipe located in a middle portion of the block in the tread circumferential direction, wherein all waved sipes of all of the blocks extending so as to be more inclined toward the tread widthwise direction than the tread circumferential direction have a zigzag shape including waves having a wavelength in the tread widthwise direction, wherein the wavelength of the all waved sipes remains constant in the tread widthwise direction such that all waved sipes in the tread have the same wavelength, wherein a width of each block in the tread widthwise direction remains constant in the tread circumferential direction throughout, and wherein each waved sipe of all waved sipes of all of the blocks open to the widthwise sides of the respective block at both ends thereof.

2. The pneumatic radial tire of claim 1, wherein a length along the bottom of the waved sipe of each projection is in the range of 0.2 to 2.0 mm and a depth of the upper end of the projection, measured from the block surface, is in the range of 20 to 80% of the depth of the waved sipe.

3. The pneumatic radial tire of claim 1, wherein a total sectional area/areas of the projections in the waved sipe/sipes located on the most-leading side or/and the most-trailing side of one block is larger than the total sectional area of the projections in the waved sipe located in the middle portion of the block.

4. The pneumatic radial tire of claim 3, wherein a ratio R1 of the total sectional area of the projections in the waved sipe located in the middle portion of a block, with respect to the total sectional area/areas of the projections in the waved sipe/sipes located on the most-leading side or/and the most-trailing side of one block, satisfies the following equation:

$$0.1:1 \leq R1 < 1:1.$$

5. The pneumatic radial tire of claim 1, wherein, regarding respective blocks in plural block rows demarcated by the plural circumferential grooves and the plural lateral grooves, the total sectional area/areas of the projections in waved sipes of the block/blocks located on one outermost side/on respective outermost sides in the widthwise direction of a tread is larger than the total sectional area of the projections in waved sipes of a block located in the center region of the tread.

6. The pneumatic radial tire of claim 5, wherein a ratio R3 of the total sectional area of the projections in the waved sipes of the block located in the center region of the tread, with respect to the total sectional area/areas of the projections in the waved sipes of a block/blocks located on one outermost side/on respective outermost sides in the widthwise direction of a tread, satisfies the following equation:

$$0.1:1 \leq R3 < 1:1.$$

7. The pneumatic radial tire of claim 1, wherein a ratio R4 of the number of the projections in the waved sipe located in the middle portion of a block with respect to the number/numbers of the projections in the waved sipe/sipes located on the most-leading side or/and the most-trailing side of one block, satisfies the following equation:

$$0.2:1 \leq R4 < 1:1, \text{ and}$$

wherein the number/numbers of the projections in the waved sipe/sipes located on the most-leading side or/and the most-trailing side of one block is at least three.

* * * * *